(12) United States Patent
Yedavalli

(10) Patent No.: US 8,644,149 B2
(45) Date of Patent: Feb. 4, 2014

(54) MECHANISM FOR PACKET FORWARDING USING SWITCH POOLS IN FLOW-BASED, SPLIT-ARCHITECTURE NETWORKS

(75) Inventor: Kiran Yedavalli, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 118 days.

(21) Appl. No.: 13/302,928

(22) Filed: Nov. 22, 2011

(65) Prior Publication Data

US 2013/0128746 A1    May 23, 2013

(51) Int. Cl.
  *H04L 12/26* (2006.01)
(52) U.S. Cl.
  USPC .......................................... 370/231; 370/238
(58) Field of Classification Search
  USPC .................. 370/230, 238, 351, 389, 400, 401
  See application file for complete search history.

(56) References Cited

U.S. PATENT DOCUMENTS

| 7,944,844 | B2 * | 5/2011 | Ee et al. .......................... 370/248 |
| 8,391,289 | B1 * | 3/2013 | Yalagandula et al. ........ 370/392 |
| 2011/0261723 | A1 * | 10/2011 | Yamato et al. ................ 370/255 |
| 2011/0261825 | A1 * | 10/2011 | Ichino ............................ 370/400 |
| 2011/0273988 | A1 * | 11/2011 | Tourrilhes et al. ............. 370/237 |
| 2011/0310894 | A1 * | 12/2011 | Karino ........................... 370/389 |
| 2012/0140637 | A1 * | 6/2012 | Dudkowski et al. ........... 370/238 |
| 2012/0155264 | A1 * | 6/2012 | Sharma et al. ................. 370/232 |
| 2013/0064243 | A1 * | 3/2013 | Akiyoshi ....................... 370/389 |
| 2013/0097335 | A1 * | 4/2013 | Jiang et al. .................... 709/245 |
| 2013/0114615 | A1 * | 5/2013 | Suemitsu et al. ............. 370/401 |

OTHER PUBLICATIONS

Brandon Heller et al., "OpenFlow Switch Specification," Oct. 23, 2010, 67 pages, Version 1.1.0 ( Wire Protocol 0x02).
Nick McKeown et al., "OpenFlow: Enabling Innovation in Campus Networks," Mar. 14, 2008, 6 pages.

* cited by examiner

*Primary Examiner* — Gary Mui
(74) *Attorney, Agent, or Firm* — Blakely, Sokoloff Taylor & Zafman LLP

(57) ABSTRACT

Method and apparatus for reducing forwarding table sizes in flow switches in a flow-based, split-architecture network is described. In an embodiment, a set of flow switches along a flow path is identified to form a switch pool. The forwarding table of only one of the flow switches in the switch pool is configured to have a flow entry that is associated with a particular flow. The flow entry includes a set of match fields for identifying packets belonging to that particular flow, and a set of actions to be performed on the packets belonging to that particular flow.

21 Claims, 6 Drawing Sheets

MECHANISM FOR PACKET FORWARDING USING SWITCH POOLS IN FLOW-BASED, SPLIT-ARCHITECTURE NETWORKS

FIELD

Embodiments of the invention relate to the field of computer networking; and more specifically, to a mechanism for packet forwarding in flow-based, split-architecture networks.

BACKGROUND

In a monolithic network architecture, both the data plane (also referred to as the forwarding plane) and control plane are integrated into the same network element. Despite the rapid improvement on line speeds, port densities, and performance, tight coupling of data and control planes in the monolithic network architecture usually results in overly complicated data and control planes and requires complex network management functions to be distributed throughout the network. This creates a huge burden for network operators and equipment manufacturers when adapting the monolithic network architecture for new protocols and results in a high cost barrier for advancing network technology developments.

Unlike the monolithic network architecture, a flow-based, split architecture decouples the forwarding and control functions of the network. In such a split-architecture network, the control and forwarding components of the network are separated, and a flow-centric view of the traffic passing through the network is provided to a centralized flow controller. Examples of networks with such a split architecture includes the access/aggregation domain of carrier-grade networks, mobile backhaul, cloud computing, and optical transport networks (OTN) and wavelength division multiplexing (WDM) networks with multilayer (Layer3 & Layer2 & Layer1) support, all of which are among the main building blocks of modern networks.

SUMMARY

According to one embodiment of the invention, a method in a centralized flow controller for reducing forwarding table sizes of forwarding tables having a set of flow entries and a default entry in flow switches in a network includes the step of determining, in the centralized flow controller, a flow path in the network for a particular flow. The method further includes the step of identifying a set of flow switches along the flow path to form a switch pool, and the step of configuring a forwarding table of only one of the flow switches in the switch pool to have a flow entry that is associated with that particular flow. That flow entry includes a set of match fields for identifying packets belonging to that particular flow, and a set of actions to be performed on the packets belonging to that particular flow.

According to one embodiment of the invention, a centralized flow controller for reducing forwarding table sizes of forwarding tables having a set of flow entries and a default entry in flow switches in a network includes a flow assignment module and a switch pool configuration module coupled to the flow assignment module. The flow assignment module is configured to determine a flow path for a particular flow, a set of match fields for identifying packets belonging to that particular flow, and a set of actions to be performed on the packets belonging to that particular flow. The switch pool configuration module is configured to identify a set of flow switches along the flow path of the particular flow to form a switch pool, and to select one of the flow switches in the switch pool to be programmed for that particular flow. The switch pool configuration module is also configured to program, in a forwarding table of the one flow switch identified, a flow entry to be associated with that particular flow with the set of match fields for identifying the packets belonging to that particular flow, and the set of actions to be performed on the packets belonging to that particular flow.

According to one embodiment of the invention, a switch pool for reducing forwarding table sizes in flow switches in a network having a centralized flow controller includes a plurality of flow switches coupled along a flow path. Each of the flow switches in the switch pool includes a communications module, a forwarding table, and a forwarding module. The communications module is configured to send and receive messages to the centralized flow controller. The forwarding table is configured to store a set of flow entries associated with corresponding flows in the network and a default entry. Each flow entry includes a set of match fields for identifying packets belonging to a flow that is associated with the flow entry, and a set of actions to be performed on packets belonging to the flow that is associated with the flow entry. The default entry includes a default action to be performed on packets that do not belong to any of the flows that are associated with the flow entries in the forwarding table of the flow switch. The forwarding module is configured, for each packet that is received on a port of the flow switch, to determine if header and port information of the packet matches the set of match fields in one of the flow entries in the forwarding table. If the header and port information of the packet matches the set of match fields in one of the flow entries, the forwarding module performs the set of actions in that flow entry. If the header and port information of the packet does not match any of the sets of match fields in the flow entries, the forwarding module performs the default action in the default entry. Only the last flow switch in the switch pool has a default action that is to send a packet that does not match any of the flow entries in the switch pool to the centralized flow controller in a packet-in message or to drop that packet.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
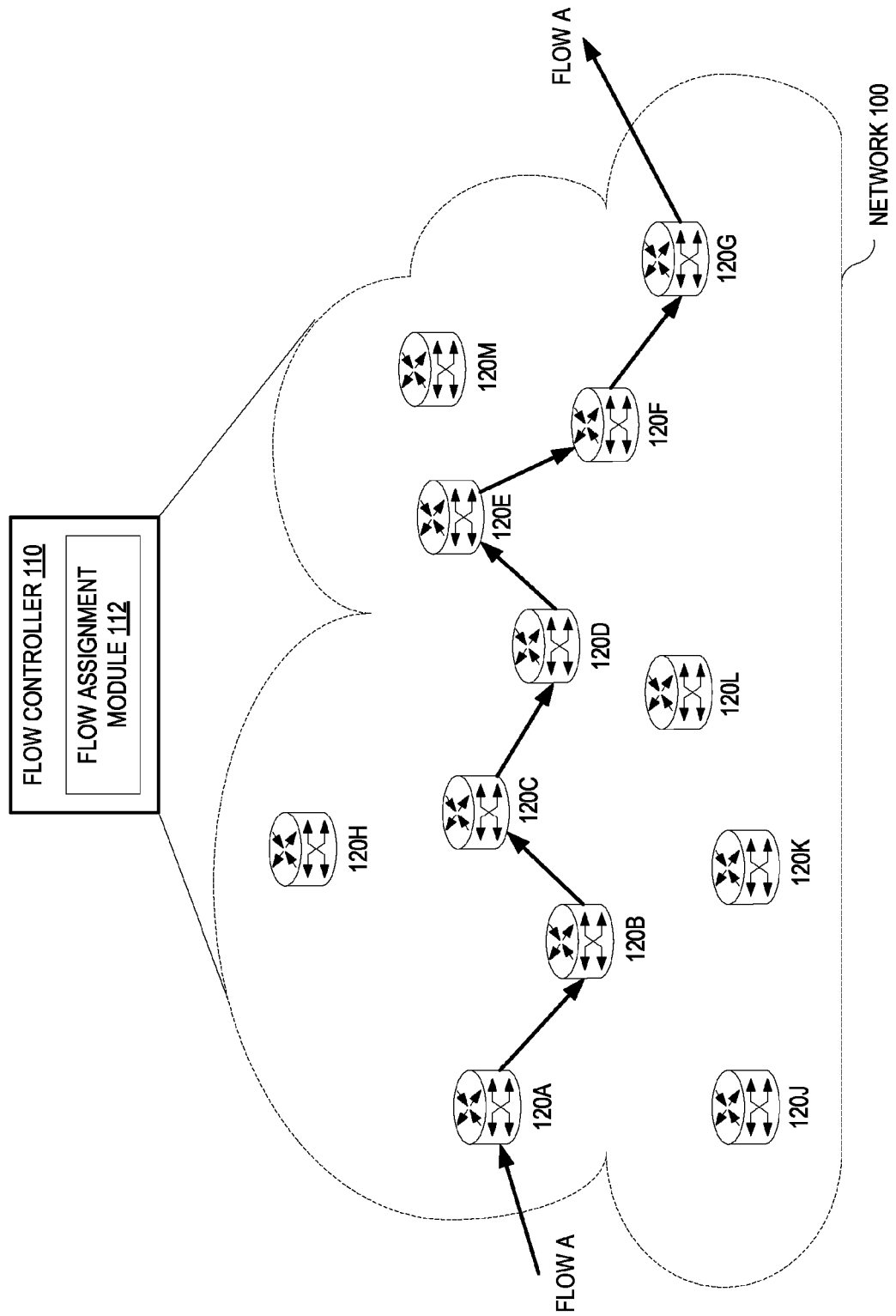
FIG. 1 illustrates an exemplary flow-based, split-architecture network.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, circuit components and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

A network element can be a multifunctional network element that integrates both a control plane and a data plane (sometimes referred to as a forwarding plane or a media plane) into the same network element. In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

A multifunctional network element can include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

Unlike a monolithic network architecture that require complex network management functions to be distributed in the control planes of multifunctional network elements throughout the network, and require complex data and control planes integrated into the same multifunctional network element, a flow-based, split-architecture network allows the data planes of the network to be separated from the control planes. Data planes can be implemented as simple discrete flow switches distributed throughout the network, and the control planes with the network's intelligence are implemented in a centralized flow controller that oversee the flow switches. By decoupling the control function from the data forwarding function, the split architecture eases the task of modifying the network control logic and provides a programmatic interface upon which developers can build a wide variety of new protocols and management applications. This allows the data and control planes to evolve and scale independently, while reducing the cost of the data plane network components.

FIG. 1 illustrates an exemplary flow-based, split-architecture network 100. A flow-based, split-architecture network will simply be referred to as a "split-architecture network." The split-architecture network 100 has a plurality of flow switches 120A-M that are controlled by the centralized flow controller 110. The centralized flow controller 110 and the flow switches 120A-M can communicate and exchange information using a protocol (e.g., OpenFlow protocol). In the split-architecture network 100, the centralized flow controller 110 collects information from the flow switches 120A-M, and a flow assignment module 112 in the centralized flow controller 110 computes and distributes the appropriate forwarding decisions to the flow switches 120A-M. Each of the flow switches 120A-M has a forwarding table that is updated and maintained by the centralized flow controller 110. The forwarding table in each flow switch has a set of flow entries that are each associated with a particular flow. Each flow entry includes a set of match fields that are used to identify packets belonging to the particular flow that is associated with the flow entry. Each flow entry also has a set of actions that the particular flow switch is to perform on packets that matches the flow entry. When an incoming packet matches a particular flow entry (i.e. the packet has header, port, and other information matching the match fields in one of the flow entries in the forwarding table), the packet is identified as belonging to the flow that is associated with the flow entry, and the associated set of actions are performed on the packet and all subsequent packets of the flow. The set of actions can include changing portions of the packet header information and forwarding out the packet on a particular port towards the next flow switch along the assigned flow path. Each flow entry also has a set of statistics associated with the particular flow such as various packet counters.

A flow switch in a split-architecture network can perform three different roles based on its location with respect to a flow in the split-architecture network—ingress flow switch, egress flow switch, and internal flow switch. A flow enters a split-architecture network through the ingress flow switch, passes through the split-architecture network domain through internal flow switches, and exits the domain through the egress flow switch. A single flow switch can serve multiple roles for different flows. For example, a single flow switch can be an ingress flow switch for one flow, an internal flow switch for a different flow, and/or an egress flow switch for another flow.

When a new flow enters the split-architecture network 100, the new flow does not have a flow entry associated with the new flow in any of the flow switches 120A-M in the split-architecture network 100, because the centralized flow controller 110 has not yet assigned a flow path to this new flow. The ingress flow switch that receives the first packet of this new flow performs a lookup in its forwarding table to determine if any of the programmed flow entries matches the new flow. If there is no match, the first packet of the new flow is sent to the centralized flow controller 110 for further processing. Alternatively, the first packet belonging to this new flow can be dropped by the ingress flow switch if the ingress flow switch is programmed to do so. Subsequent packets belonging to this new flow that arrives at the ingress flow switch prior to the assignment of a flow path to this new flow are either buffered or dropped at the ingress flow switch according to the configuration of the centralized flow controller 110 and the ingress flow switch.

To facilitate the processing of packets that do not match any of the programmed flow entries, the forwarding table of each flow switch 120A-M has a default entry with a default action that is to either send a packet that does not match any programmed flow entries to the centralized flow controller 110 or to drop that packet. The default entry is reached when the flow switch has searched through all the programmed flow entries in its forwarding table and determined that the packet does not match any of the programmed flow entries. Hence, when a first packet of a new flow is received at an ingress flow switch, the ingress flow switch would search its forwarding table for a programmed flow entry that has match fields matching the packet and end up at the default entry because none of the flow entries has match fields that match the first packet of a new flow. The ingress flow switch will then execute the default actions associated with the default entry, which may include sending this first packet of the new flow to the centralized flow controller 110 for further processing.

Once the centralized flow controller 110 receives the first packet of the new flow, it determines the appropriate flow path for the flow and the flow entries that need to be programmed in the underlying flow switches for this particular flow. The centralized flow controller 110 programs these flow entries in the respective flow switches, and forwards the first flow packet accordingly or drops it according to the configuration of the centralized flow controller 110. If, per configuration, the ingress flow switch buffers subsequent packets of the new flow that are received prior to the assignment of a flow path to the new flow, as soon as the flow entries for the new flow are programmed on the flow switches along the flow path, the buffered packets are processed and forwarded accordingly. The ingress flow switch may send an acknowledgement packet to the source of the new flow (e.g., an end user) to notify the source that the packets have been accepted such that the source does not resend the buffered packets. Alternatively, if, per configuration, the ingress flow switch drops the subsequent packets of the new flow that are received prior to the assignment of a flow path to the new flow, the source of the new flow would restart the flow and resend the packets belonging to the flow. For example, the source may restart the new flow after a certain amount of time has lapsed without receiving an acknowledgement packet from the ingress flow switch. Subsequent packets that are received after the forwarding tables have been programmed for the new flow will be forwarded correctly by the flow switches along the flow path, as the flow entries are now programmed with information and actions for the new flow.

Figure 3:
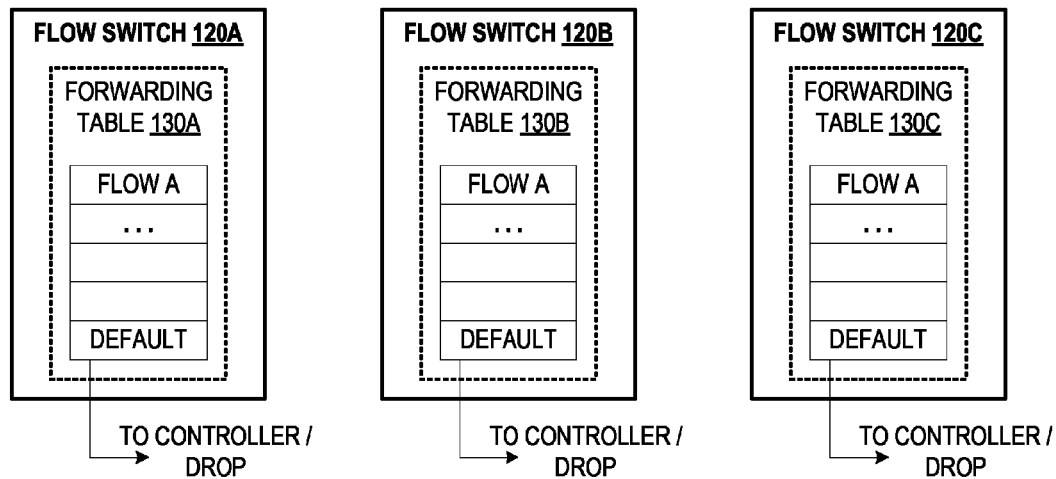
FIG. 3 illustrates an exemplary set of flow switches in a flow-based, split-architecture network.

By way of example, suppose the first packet for a new flow, FLOW A, enters the split-architecture network 100. This packet enters the split-architecture network 100 at flow switch 120A, and hence, flow switch 120A is the ingress flow switch for FLOW A. Flow switch 120A determines that this packet does not match any of its flow entries and forwards the packet to the centralized flow controller 110. The centralized flow controller 110 assigns the flow path as indicated by the arrows in FIG. 1 for FLOW A. The flow path is made up of flow switches 120A through 120G in order. This new flow is to enter the split-architecture network 100 at ingress flow switch 120A and traverse through flow switches 120B-G. This new flow exits the split-architecture network 100 at flow switch 120G, and hence, flow switch 120G is the egress flow switch for FLOW A. When the centralized flow controller 110 assigns this flow path to FLOW A, the centralized flow controller 110 configures each of the flow switches 120A-G to have a flow entry associated with FLOW A in their respective forwarding tables. The programmed forwarding tables 130A-C of the flow switches 120A-C are shown in FIG. 3. As illustrated, each forwarding table 130A-C has a flow entry that is associated with FLOW A. The forwarding tables of the other flow switches 120D-G along the flow path also have a flow entry associated with FLOW A. In this manner, when each of the flow switches 120A-G receives a packet belonging to FLOW A, the flow switch can lookup the set of actions in the flow entry that is associated with FLOW A to correctly forward the packet along the flow path assigned to FLOW A.

Once the centralized flow controller 110 has programmed the flow entries in the forwarding tables of the flow switches 120A-G for FLOW A, when a packet belonging to FLOW A enters the split-architecture network 100 at the ingress flow switch 120A, the ingress flow switch 120A performs a lookup of a set of match fields (e.g., header and port information) in the packet to determine if the match fields of the packet matches any of the programmed flow entries in the forwarding table 130A of the ingress flow switch 120A. The ingress flow switch 120A determines that a matching entry is found because the centralized flow controller 110 has previously programmed a flow entry for FLOW A in forwarding table 130A. The flow entry for FLOW A includes a set of actions that the ingress flow switch 120A should perform on the packet to correctly forward the packet along the flow path for FLOW A. The ingress flow switch 120A then performs these actions and forwards the packet to flow switch 120B according to the set of actions in the flow entry for FLOW A in its forwarding table 130A. When flow switch 120B receives this packet, flow switch 120B performs a lookup in its forwarding table 130B and forwards the packet accordingly along the flow path for FLOW A. This process repeats at each flow switch 120A-G along the flow path for FLOW A.

In the split-architecture network 100, whenever a new flow enters the split-architecture network 100, the forwarding table sizes in all the flow switches along the flow path corresponding to the new flow would increase to accommodate the new flow entry associated with the new flow. As the number of end users increases with growing networks, the number of flows in a network and corresponding flow entries in forwarding tables also increases. At some point, all the flow entries of the forwarding tables would be used up and the flow switches would not able to accommodate any new flows and users. At this point, the operator would need to upgrade the flow switches with bigger and more expensive flow switches with higher memory capacity, thus increasing the overall cost of deployment and operation of the network. Having huge forwarding tables also has other disadvantages. When a flow switch fails, all user traffic associated with flows that are programmed in the flow entries of that flow switch will be disrupted. Thus, the failure of a flow switch with a huge forwarding table will disrupt a greater number of user traffic than the failure of a flow switch with a smaller forwarding table. Huge forwarding table sizes also results in slower packet lookups causing unwanted network latencies. Accordingly, a more efficient use of the forwarding tables in the flow switches of a split-architecture network would reduce the impact of the increasing number of flows in a network.

Figure 2:
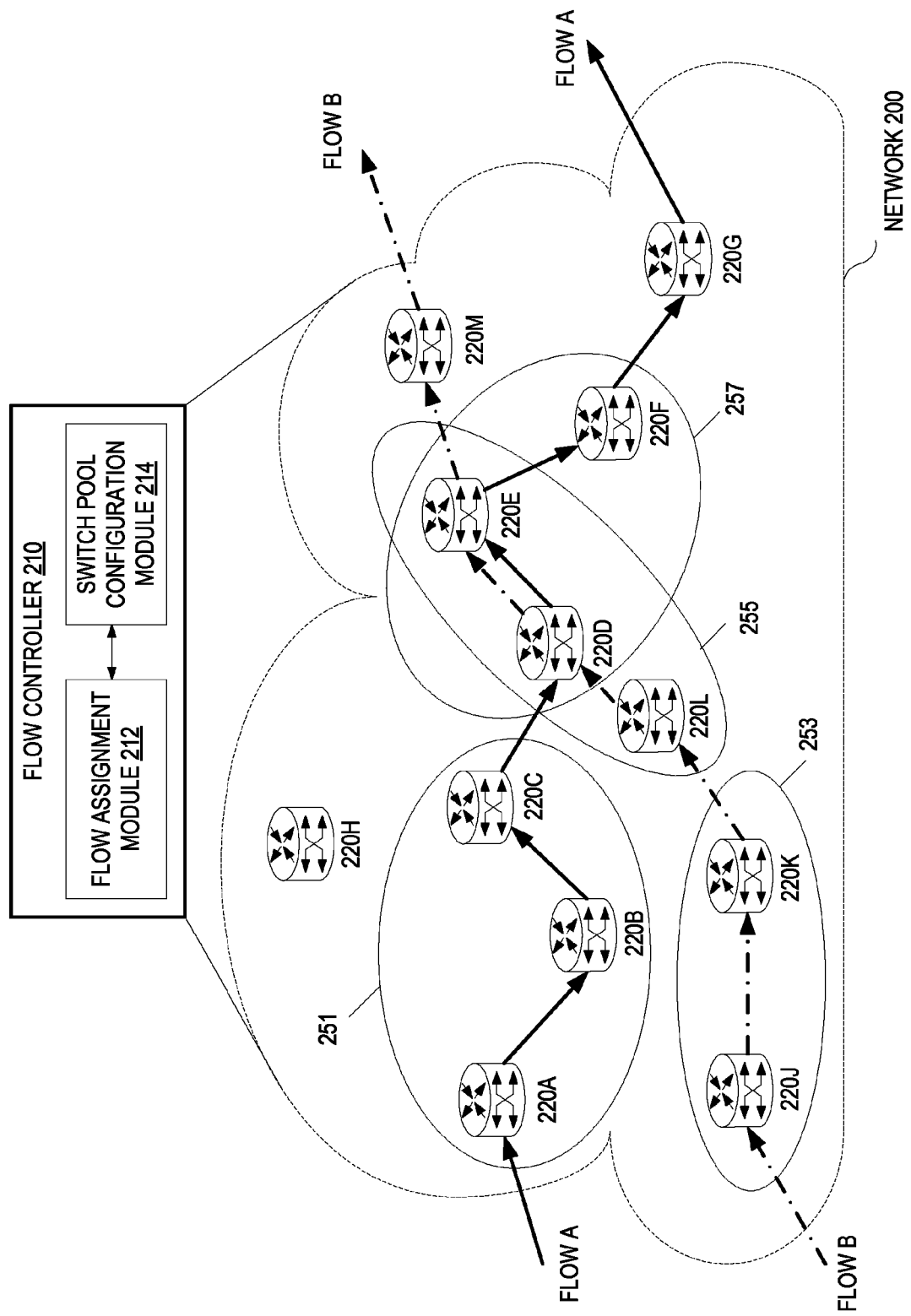
FIG. 2 illustrates an exemplary flow-based, split-architecture network according to one embodiment of the invention.

FIG. 2 illustrates an exemplary flow-based, split-architecture network 200 according to one embodiment of the present invention. The split-architecture network 200 has a plurality of flow switches 220A-M that are under the control of the centralized flow controller 210. Some of the flow switches 220A-M are grouped together along chains to form switch pools. For example, flow switches 220A-C are grouped into switch pool 251, flow switches 200D-F are grouped into switch pool 257, flow switches 200J-K are grouped into switch pool 253, and flow switches 220L, 220D and 200E are grouped into switch pool 255. An individual flow switch can belong to more than one switch pool. For example, flow switches 220D and 220E belong to both switch pools 225 and 257. The chain of flow switches within a switch pool acts collectively as a single flow switch and shares the forwarding responsibilities among them. Hence, the forwarding tables in the flow switches that are part of a switch pool can be shared among the flow switches within the switch pool. Based on the location and role of the flow switches for a given flow, there can be "ingress switch pools" and "internal switch pools." The ingress switch pool is a collection or a chain of flow switches acting as a single ingress flow switch, for example, switch pools 251 and 253. The internal switch pool is a collection or chain of flow switches acting as a single internal flow switch, for example, switch pools 255 and 257.

Note that the switch pool concept is applicable to ingress and internal switch pools. In other words, flow switches are not grouped together to form egress switch pools. The reason for this is that the flow entry of a flow exiting the split-architecture network in an egress flow switch depends on the status of the egress port of the egress flow switch. Thus, the flow entries for flows that are exiting a split-architecture network from a particular egress flow switch have to be programmed within the forwarding table of the egress flow switch. Nevertheless, a particular egress flow switch can still be part of some other switch pool (e.g., part of another internal switch pool for a different flow, part of another ingress switch pool for some other flow), as long as all the flow entries for flows exiting the split-architecture network from that egress flow switch is programmed within the forwarding table of that egress flow switch.

Referring to FIG. 2, switch pool 251 is an ingress switch pool for FLOW A, switch pool 257 is an internal flow switch for FLOW A, and flow switch 220G is an egress flow switch for FLOW A. Hence, FLOW A has the assigned flow path of 220A-220B-220C-220D-220E-220F-220G. Switch pool 253 is an ingress switch pool for FLOW B, switch pool 255 is an internal flow switch for FLOW B, and flow switch 220M is an egress flow switch for FLOW B. Hence, FLOW B has the assigned flow path of 220J-220K-220L-220D-220E-220M.

In embodiments of the present invention, instead of forwarding the first packet of a new flow to the centralized flow controller 210 right away at the ingress flow switch, the first packet of a new flow is forwarded to all the flow switches along the chain within the ingress switch pool, and only the last flow switch along the chain within the ingress switch pool would forward the packet to the centralized flow controller 210 after the lookups for a matching flow entry in each and every flow switch within the ingress switch pool have failed. This is achieved by utilizing the default entry in the forwarding tables of the flow switches. The default action associated with the default entry is performed when none of the programmed flow entries in the forwarding table of a particular flow switch matches an incoming packet. Usually, the default entry in all flow switches would either forward an unmatched packet (i.e. a packet that does not match any of the flow entries in the forwarding table of a flow switch) to the centralized flow controller 210 or drop the unmatched packet based on the default action as shown in FIG. 3. However, in embodiments of the present invention, the default action associated with the default entry of each flow switch except the last flow switch in an ingress switch pool would forward an unmatched packet to another pre-determined flow switch within the ingress switch pool. This would be repeated until all the flow switches in the ingress switch pool have been searched for a matching flow entry. In the last flow switch in the ingress switch pool, the default action associated with the default entry would either forward the packet to the centralized flow controller 210 or drop the packet based on the configuration of the default action. Hence, the ingress switch pool is a chain of flow switches through which an unmatched packet would traverse in a pre-determined order before being sent to the centralized flow controller 210 or dropped.

In an ingress switch pool according to embodiments of the present invention, only one flow switch can have the role of an ingress flow switch, and all other flow switches in the ingress flow switch should not be used as an entry point for packets entering a split-architecture network. This allows for a single point of entry within the ingress switch pool for packets to enter a split-architecture network through the ingress flow switch. As described above, a switch pool is a chain of flow switches, and in an ingress switch pool, the ingress flow switch is assisted by the other flow switches within the ingress switch pool in performing the forwarding decisions by sharing the forwarding tables among the flow switches within the ingress switch pool. The ingress switch pool is also task with either forwarding the first packet for a new flow to the centralized flow controller 210 or to drop that packet. If there are multiple ingress flow switches within the ingress switch pool and they are at different positions along the chain, then a packet entering a split-architecture network in an intermediate flow switch in the middle of the chain would miss out on the flow entries that are programmed in the upstream flow switches. In other words, the flow entries in the upstream flow switches would not be searched for a match to that packet. Even though the flow entries in the intermediate flow switch and the downstream flow switches within the ingress switch pool would be searched, if the packet does not match any of those flow entries, it would not be possible to determine if the packet is for a new flow or for a pre-existing, previously assigned flow because the flow entries in the upstream flow switches have not been searched. Thus, while a particular flow switch may belong to more than one switch pool, for a given ingress switch pool, there should be only one ingress flow switch through which packets enter the split-architecture network.

Figure 4:
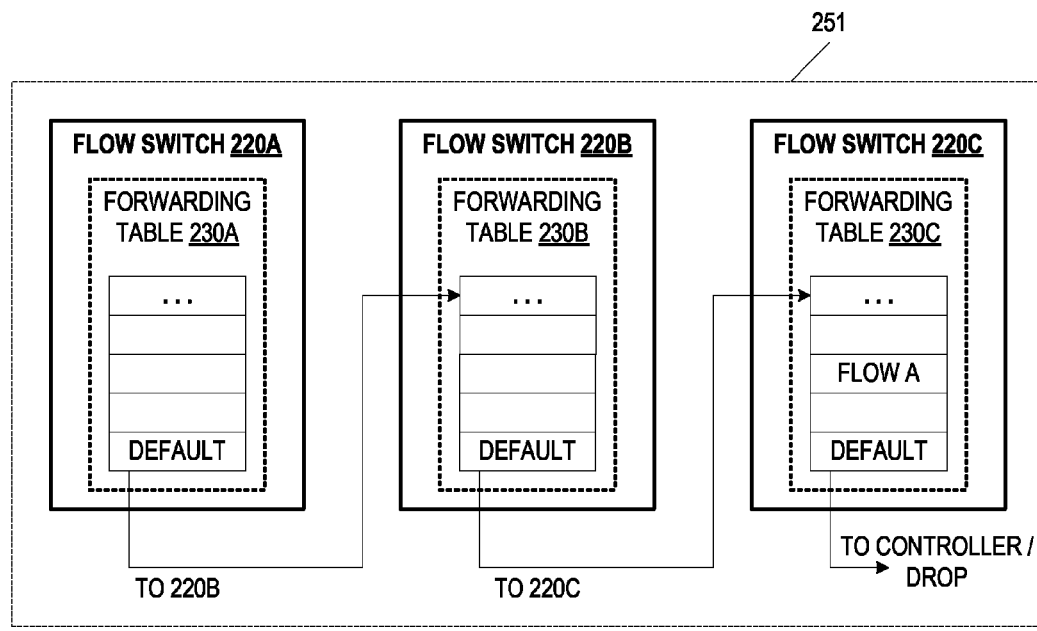
FIG. 4 illustrates an exemplary switch pool in a flow-based, split-architecture network according to one embodiment of the invention.

By way of example, FIG. 4 illustrates an ingress switch pool 251 in the exemplary flow-based, split-architecture network 200 according to one embodiment of the present invention. The ingress switch pool 251 is made up of flow switches 220A-C. The flow switches 220A-C are arranged along the chain in the order 220A, 220B, and 220C. Flow switch 220A is the ingress flow switch for the ingress switch pool 251. Hence, any packet that is entering the split-architecture network 200 through this ingress switch pool would enter the split-architecture network 200 through flow switch 220A. It should be noted that this does not mean all packets entering the split-architecture network 200 is required to enter through flow switch 220A. This just means that packets for a flow associated with switch pool 251 should not be entering the split-architecture network 200 at flow switches 220B and 220C. Note that flow switch 220B and 220C can be an ingress flow switch for some other switch pool. The split-architecture network 200 may have other ingress switch pools each with a different ingress flow switch, for example, ingress switch pool 253, where packets can enter the split-architecture network through ingress flow switch 220J.

As mentioned above, the ingress switch pool 251 is made up of flow switches 220A-C arranged along the chain in the order 220A, 220B, and 220C. Hence, in flow switch 220A, rather than having a default action associated with the default entry in forwarding table 230A that is to either forward an unmatched packet to the centralized flow controller 210 or to drop that packet, the default entry in forwarding table 230A has a default action that is to forward an unmatched packet to flow switch 220B. The default entry in forwarding table 230B of flow switch 220B is similarly programmed to forward an unmatched packet to flow switch 220C. Because flow switch 220C is the last flow switch in the switch pool 251, the default entry in forwarding table 230C of flow switch 220C is to forward an unmatched packet to the centralized flow controller 210 or to drop that packet.

FIG. 4 illustrates the forwarding tables 230A-C in the flow switches 220A-C of a switch pool according to one embodiment of the present invention. In FIG. 4, the flow entry associated with FLOW A is shown to be programmed in the forwarding table 230C in flow switch 220C. When a packet for FLOW A enters the split-architecture network 200 at ingress flow switch 220A, ingress flow switch 220A performs a lookup of a set of match fields (e.g., header, port, or other information) in the packet to determine if the match fields of the packet match any of the programmed flow entries in the forwarding table 230A of the ingress flow switch 220A. None of the flow entries in forwarding table 230A matches the packet for FLOW A, and ingress flow switch 220A forwards the packet to flow switch 220B according to the default entry in forwarding table 230A. Upon receiving the packet from flow switch 220A, flow switch 220B performs a lookup of a set of match fields in the packet to determine if the match fields of the packet match any of the programmed flow entries in the forwarding table 230B of the flow switch 220B. None of the flow entries in forwarding table 230B matches the packet for FLOW A, and flow switch 220A forwards the packet to flow switch 220C according to the default entry in forwarding table 230B. Upon receiving the packet from flow switch 220B, flow switch 220C performs a lookup of a set of match fields in the packet to determine if the match fields of the packet match any of the programmed flow entries in the forwarding table 230C of the flow switch 220C. Flow switch 220C finds a match because the centralized flow controller 210 has previously programmed a flow entry that is associated with FLOW A in forwarding table 230C. Flow switch 220C then forwards the packet according to the set of actions associated with that flow entry to forward the packet along the flow path for FLOW A towards flow switch 220D.

As it can be seen by comparing FIG. 3 and FIG. 4, by grouping a set of flow switches into a switch pool and sharing the forwarding tables among the flow switches in the switch pool, the number of flow entries that are required to be programmed for a particular flow is reduced. Hence, the total amount of memory that would be required for storing flow entries in the forwarding tables of the flow switches within a switch pool can be reduced. Furthermore, because a smaller number of flow switches are required to be programmed for a particular flow, the flow path can be set up faster to reduce network latency than the case where each and every flow switch along the flow path has to be programmed first before the flow is set up.

While the above operations have been described with reference to ingress switch pool 251, the operations for an internal switch pool such as switch pools 255 and 257 are similar to that of an ingress switch pool. However, even though the last flow switch in an internal switch pool would have a default action that would either forward an unmatched packet to the centralized flow controller 210 or drop the packet based on the configuration, if the flow entries are accurately programmed on a flow path, the default entry of the last flow switch in an internal switch pool is not expected to be hit because any packet that does not match any of the flow entries would have already been processed by an ingress switch pool upstream.

Referring back to FIG. 2, one or more of flow switches within a switch pool can be part of another flow path for a different flow of another switch pool. If more than two flow switches in order along the chain in a switch pool are shared with another switch pool, then the chain of the other switch pool should have the shared flow switches arranged in the same order. By way of example, flow switches 220D and 220E are part of the flow path for FLOW A in switch pool 257, and are part of the flow path for FLOW B in switch pool 255. The two switch pools 257 and 255 can share flow switches 220D and 220E because FLOW A and FLOW B both traverse through flow switches 220D and 220E in the same order.

By way of example, in one embodiment, the flow entry for FLOW A within switch pool 257 is programmed in flow switch 220F, and the flow entry for FLOW B within switch pool 255 is programmed in flow switch 220E. In other embodiments, other switch pools for FLOW A and FLOW B can be formed. Depending on which flow switches are grouped together to form a switch pool, the flow entry for FLOW A can alternatively be programmed in flow switch 220D or 220E. Similarly, the flow entry for FLOW B can alternatively be programmed in flow switch 220L or 220D.

Figure 5:
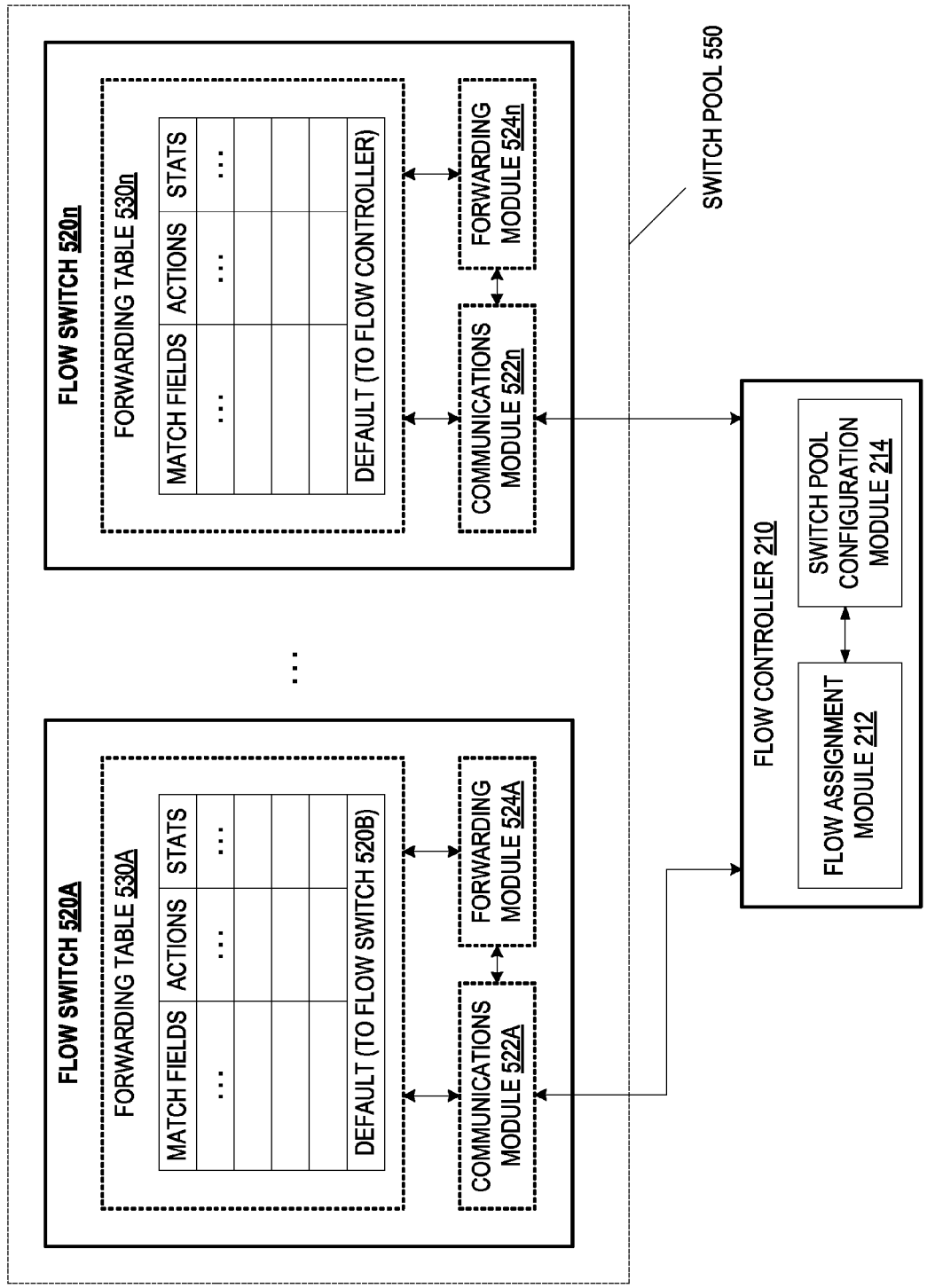
FIG. 5 illustrates an exemplary switch pool and an exemplary centralized flow controller according to one embodiment of the invention.

FIG. 5 illustrates, more generally, a centralized flow controller 210 and a switch pool 550 according to an embodiment of the present invention. The switch pool 550 includes a plurality of flow switches 520A-520n. The flow switches 520A-520n within the switch pool 550 share the use of their forwarding tables 530A-530n among themselves such that within the switch pool 550, the flow entry for a particular flow only needs to be programmed in the flow table of one of the flow switches 520A-520n. Hence, by grouping flow switches 520A-520n into a switch pool 550, the forwarding table sizes can be reduced because instead of having to program one flow entry per flow in every flow switches 520A-520n (for a total of n flow entries), only one flow entry per flow among all the flow switches 520A-520n (for a total of 1 flow entry) within the switch pool needs to be programmed to maximize the reduction of forwarding table sizes of forwarding tables 530A-530n. It should be noted that in alternative embodiments and in certain circumstances (e.g., when there is a Quality of Service requirement associated with a flow) as will be described, a particular flow can be associated with more than one flow entry among all the flow switches 520A-520n within switch pool 550, while other flows associated with switch pool 550 are only associated with one flow entry.

The flow switches 520A-520n are coupled together in a predetermined order along a flow path. Each of the flow switches 520A-520n includes a communications module 522, a forwarding table 530 coupled to the communications module 522, and a forwarding module 524 coupled to the forwarding table 530. The communications module 522 is configured to send and receive messages with the centralized flow controller 210. The communications module 522 can send and receive messages with the centralized flow controller 210 using a protocol (e.g., OpenFlow protocol). By way of example, the centralized flow controller 210 can send a features request message to the flow switches 520A-520n to request the capabilities of a particular flow switch or send a read-state message to the flow switches 520A-520n to request network statistics from a particular flow switch. The communications module 522 of the particular flow switch would receive these messages and reply to the centralized flow controller 210 with the requested information. The centralized flow controller 210 can send a configuration message to the flow switches 520A-520n to set parameters in the particular flow switch or send a modify-state message to program and manage the forwarding table 530 of the particular flow switch. The communications module 522 of the particular flow switch would receive these messages and set the parameters of the flow switch and program the forwarding table 530 accordingly. The communications module 522 of a particular flow switch can send a flow-removal message to the centralized flow controller 210 to alert the centralized flow controller 210 that a particular flow has been idle for a predetermined period of time. The communications module 522n of the last flow switch 520n can send a packet-in message that may include at least a portion (e.g., packet header) of a first packet of a new flow to the centralized flow controller 210 for further processing, such that the centralized flow controller 210 can assign a flow path for the new flow and program an appropriate flow entry in the switch pool 550.

The forwarding table 530 is configured to store a set of flow entries each associated with a particular flow in a split-architecture network. Each flow entry includes a set of match fields for identifying packets belonging to a flow that is associated with the flow entry, a set of actions to be performed on packets belonging to the flow that is associated with the flow entry, and a set of flow statistics for the flow that is associated with the flow entry.

By way of example, the set of match fields can be a combination of any or all of the possible fields in a packet (e.g., header, port, or other information). For example, the set of match fields for a flow entry can be key fields from different levels of headers in the protocol stack, such as the source and destination Ethernet Media Access Control (MAC) addresses, source and destination Internet Protocol (IP) addresses, source and destination transport port numbers such as Transmission Control Protocol (TCP), User Datagram Protocol (UDP), or Stream Control Transmission Protocol (SCTP) port numbers, as well as the ingress port number. Other fields that may be used include Ethernet type, Virtual Local Area Network (VLAN) ID, VLAN priority, Multiprotocol Label Switching (MPLS) label, MPLS traffic class, Address Resolution Protocol (ARP) opcode, and/or other metadata. To identify a packet as belonging to a particular flow, the packet may be required to match all of the programmed match fields in a flow entry. It is also possible to restrict the matching rule to a subset of the programmed match fields by using wildcards for the unwanted fields. Furthermore, each flow entry that is associated with a different flow can use different fields as the set of match fields for that particular flow.

By way of example, the set of actions to be performed on packets belonging to the flow that is associated with the flow entry can include one or more of a set-output-port action, a set-field action, a push-tag action, a pop-tag action, and/or other packet manipulating action. A set-output port action forwards the packet out a particular port, the ingress port, or all the ports of the flow switch except for the ingress port of the packet. A set-field action modifies one or more header fields of the packet such as any of the fields described above. A push-tag action adds an additional tag to the packet. The tag can include Ethernet header fields, VLAN header fields, MPLS header fields, ARP/IP header fields, and/or TCP/UDP/SCTP header fields. A pop-tag action removes a tag such as the tag described above from a packet. It should be noted that a set-field action is different from the push/pop-tag actions in that the set-field action modifies an existing header field, whereas the push/pop-tag actions add or remove header fields in a tag.

By way of example, the set of flow statistics for the flow that is associated with the flow entry can include the number of received packets for the flow, the number of bytes received for the flow, and the duration of the flow. A particular flow switch can also maintain other statistics that are not per flow based. For example, a particular flow switch can keep a count of the number of forwarding table lookups, the number of matches, and the number of active flow entries. A particular flow switch can also maintain statistics per port such as received and transmitted packets and bytes per port, number of packets dropped per port, and the number of packet errors per port.

In addition to the set of flow entries described above, each forwarding table 530 also includes a default entry. The default entry includes a default action that is to be performed on packets that do not belong to any of the flows that are associated with the flow entries in the forwarding table 530 of the particular flow switch (i.e. packets that do not match the set of match fields in any of the flow entries in that flow switch). In each of the forwarding tables 530 of the flow switches in the switch pool 550 other than the last flow switch 530n, the default entry has a default action that forwards a packet that does not match any of the flow entries in the forwarding table of the particular flow switch to the next flow switch along the flow path in the switch pool 550. In the forwarding table 530n of the last flow switch 530n in the switch pool 550, the default entry has a default action that is either to send a packet that does not match any of the flow entries in all of the forwarding tables 530A-530n of the switch pool 550 to the centralized flow controller 210 in a packet-in message or to drop that packet.

The forwarding module 524 is configured, for each packet that is received on a port of the particular flow switch, to determine if the header, port, or other information of a packet matches the set of match fields in one of the flow entries in the forwarding table 530. If the header, port, or other information of the packet matches the set of match fields in one of the flow entries in the particular flow switch (i.e. the packet belongs to the flow that is associated with the flow entry), the set of actions in that flow entry is performed on packet. If the header, port, or other information of the packet does not match any of the sets of match fields in the flow entries in that particular flow switch, the default action in the default entry in the forwarding table 530 is performed on packet.

Generally, within the switch pool 550, each one of the flows only needs to be associated with one flow entry within the collective of all the forwarding tables 530A-530n. In other words, of all the flow entries in all the forwarding tables 530A-530n combined together within the switch pool 550, only one flow entry needs to be programmed for a particular flow. That is, a flow can be associated with, for example, only one flow entry in the entire switch pool 550. While a flow can be associated with more than one flow entries in the switch pool 550, this is generally not required in order for the switch pool 550 to properly forward packets belonging to the flow.

One or more of flow switches 520A-520n in the switch pool 550 can also be part of another flow path for a different flow of another switch pool. If more than two adjacent flow switches along the chain in switch pool 550 are shared with another switch pool, then the chain of the other switch pool (i.e. the ordering of the flow switches along a flow path) should have the shared adjacent flow switches arranged in the same order as switch pool 550. If the switch pool 550 is an ingress switch pool, then only one of the flow switches 520A-520n in the switch pool 550 is an ingress flow switch for all flows that are associated with the flow entries in the forwarding tables 530A-530n of the flow switches 520A-520n in the switch pool 550.

By sharing the forwarding tables 530A-530n within the switch pool 550, the forwarding table sizes and the number of flow entries per flow switch can be reduced. A smaller forwarding table can lead to shorter lookup times and greater efficiency of packet forwarding. Furthermore, because the number of flow entries required per flow switch is lower, the memory capacity requirement per flow switch is also lower, thus reducing the overall cost of the flow switch. In addition, if one of the flow switches 530A-530n fails in the switch pool 550, only those of the flows whose flow entry is stored in the particular failed flow switch may be affected, while the flow entries stored in the other functioning flow switches may still be used to forward packets correctly if the flow path of those flows do not traverse through the failed flow switch.

While generally, only one flow entry per flow is required within a switch pool, a flow that has a Quality of Service (QoS) requirement is treated differently. The QoS policy applied to a flow by a flow switch in the split-architecture network is determined by the set of actions associated with the flow entry for that flow (e.g., make queue assignments as part of the set of actions associated with the flow entry). In order to meet the QoS requirement of the flow, the QoS policy for the flow is applied at every flow switch along the flow path of the flow. If a particular flow switch is unaware of the QoS requirement of the flow, that flow switch may fail to apply the proper QoS policy to that flow. Hence, rather than just programming one flow entry in the entire switch pool, a flow entry associated with a flow that has a QoS requirement is programmed in every flow switch along the flow path.

For a new flow that has a QoS requirement, the QoS policy is not applied to the first packet of the new flow until the first packet of that new flow reaches the centralized flow controller after passing through all the flow switches in an ingress switch pool. When this packet reaches the centralized flow controller, based on the path that the flow is going to take, the centralized flow controller programs the flow entries for this specific flow with the QoS requirement on all flow switches in all switch pools that are along the flow path. This is different from the general case when there is no QoS requirement for a flow, in which case, only one flow entry will be programmed for that flow in the entire switch pool.

Referring back to FIG. 5, the components and operations of the centralized flow controller 210 for reducing forwarding table sizes of forwarding tables 530A-530n in flow switches 520A-520n in a split-architecture network according to embodiments of the present invention will now be described. The centralized flow controller 210 includes a flow assignment module 212 and a switch pool configuration module 214. The flow assignment module 212 is configured to determine a flow path for a particular flow in response to receiving a packet-in message to indicate that a packet is received in the split-architecture network that does not match any of the flow entries in the forwarding tables 530A-530n of the flow switches 520A-520n in the split-architecture network. In addition to determining a flow path for the particular flow, the flow assignment module 212 is also configured to determine a set of match fields for identifying packets belonging to that particular flow, and a set of actions to be performed on the packets belonging to that particular flow.

According to embodiments of the present invention, the switch pool configuration module 214 is configured to identify a set of flow switches along the flow path of a particular flow to form a switch pool, and to select one of the flow switches in the switch pool to be programmed for that particular flow. The switch pool configuration module 214 is also to configure or program, in a forwarding table of the one flow switch selected in the switch pool, a flow entry to be associated with that particular flow with the set of match fields for identifying the packets belonging to that particular flow and the set of actions to be performed on the packets belonging to that particular flow. Additionally, the switch pool configuration module 214 is to configure or program the forwarding table of the last flow switch in the switch pool to have a default entry with a default action. The default action is to either send a subsequent packet that does not match any of the flow entries in the forwarding tables of the flow switches in the switch pool to the centralized flow controller in a subsequent packet-in message, or to drop that subsequent packet. Furthermore, the switch pool configuration module 214 is also to configure or program the forwarding tables of the other flow switches in the switch pool other than the last flow switch in the switch pool to have a default entry with a default action that forwards a subsequent packet that does not match any of the flow entries in the forwarding table of the particular flow switch to a next flow switch along the flow path in the switch pool.

A switch pool can be constructed using different mechanisms. For example, a switch pool can be constructed using the existing topology of a split-architecture network. In other words, the switch pool configuration module 214 takes an existing topology of the split-architecture network, and identifies a switch pool that fits a particular flow path in that existing topology. Alternatively, the switch pool configuration module 214 can modify an existing topology to construct a new topology by adding new flow switches to form a switch pool.

The centralized network controller 210 has complete network information on the condition and status of the flow switches including the status of all the forwarding tables in all the flow switches, their current sizes, the network topology, and the capabilities of the flow switches. This network information is obtained by the centralized network controller 210 using specific control messages used to communicate with the flow switches (e.g., OpenFlow protocol messages described above). The role of a flow switch in a switch pool is determined by the switch pool configuration module 214 using such network information. The switch pool configuration module 214 determines the role or roles of a flow switch based on the topology of the split-architecture network, calculation of the flow path for a particular flow, and the capabilities of the flow switches. Thus, the centralized network controller 210 determines and tracks the different ingress and internal switch pools.

The switch pool configuration module 214 in the centralized network controller 210 can use any mechanism or algorithm to determine the roles of flow switches and consequently the boundaries of switch pools based on the available network information. The switch pool configuration module 214 can follow one of many algorithms for identifying the set of flow switches to form a switch pool and for selecting which one of the flow switches in the switch pool to program. Examples of these algorithms include, but are not limited to, a shortest-path first selection, a round-robin selection, a shortest-table first selection, or a longest-table first selection. In a shortest-path first selection, the flow entry for a particular flow is programmed in the flow switch that provides the shortest path along the flow path of the flow. In a round-robin selection, the list of the flow switches in the switch pool is maintained, and flow entries for new flows are programmed in a round-robin fashion within the switch pool. In a shortest-table first selection, the forwarding table sizes of all the flow switches in a switch pool is maintained, and flow entries for new flows are programmed in the forwarding table of the flow switch with the least number of programmed flow entries. In a longest-table first selection, the forwarding table sizes of all the flow switches in a switch pool is maintained, and flow entries for new flows are programmed in the forwarding table of the flow switch with the highest number of programmed flow entries. Alternatively, the switch pool configuration module 214 in the centralized network controller 210 can use any other algorithm to program flow entries in a switch pool other than or in combination with any of the algorithms described above.

When all the flow switches in a switch pool have exhausted their flow entries in their respective forwarding tables, a new flow switch can be added to the switch pool. The centralized network controller 210 would reconfigure the flow switches in the particular switch pool to add the new flow switch to the switch pool. Hence, the forwarding table size of the switch pool is increased by adding an additional flow switch to the switch pool. The switch pool configuration module 214 can then add new flows to the forwarding table of the newly added flow switch of the switch pool. As such, another advantage of embodiments of the present invention is that adding additional inexpensive flow switches to a switch pool to accommodate a greater number of flow entries is easier and more economical than taking an existing flow switch out of service and replacing it with a much more expensive flow switch with higher memory capacity.

Figure 6:
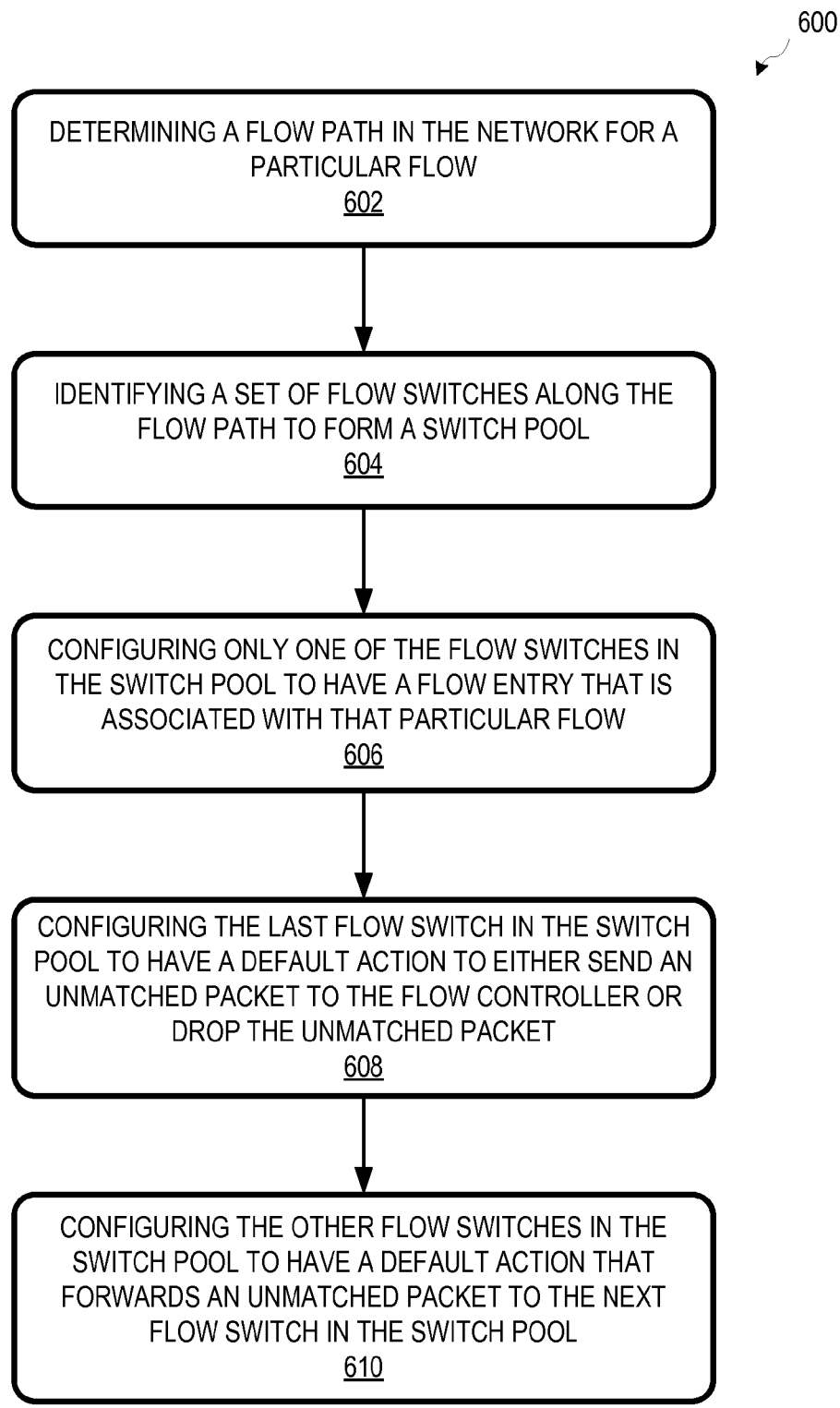
FIG. 6 illustrates a flow diagram of an exemplary method for reducing forwarding table sizes in flow switches according to one embodiment of the invention.

FIG. 6 shows a flow diagram 600 of a method for reducing forwarding table sizes of forwarding tables in flow switches in a split-architecture network according to embodiments of the present invention. The operations of this flow diagram will be described with reference to the exemplary embodiments of the other diagrams (e.g., the centralized flow controller 210 of FIG. 5). However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

In block 602, the centralized flow controller 210 determines a flow path in the split-architecture network for a particular flow. The operations of block 602 can be performed in response to receiving, in the centralized flow controller, a packet-in message to indicate that a packet is received in the split-architecture network that does not match any of the flow entries in the forwarding tables of the flow switches in the split-architecture network. In block 604, the centralized flow controller 210 identifies a set of flow switches along the flow path to form a switch pool. In block 606, the centralized flow controller 210 configures or programs a forwarding table of only one of the flow switches in the switch pool to have a flow entry that is associated with that particular flow. The flow entry includes a set of match fields for identifying packets belonging to that particular flow, and a set of actions to be performed on the packets belonging to that particular flow. In block 608, the centralized flow controller 210 configures or programs a forwarding table of the last flow switch in the switch pool to have a default entry with a default action that is to either send a subsequent packet that does not match any of the flow entries in the forwarding tables of the flow switches in the switch pool to the centralized flow controller 210 in a subsequent packet-in message or to drop that subsequent packet. In block 610, the centralized flow controller 210 configures or programs the forwarding tables of the other flow switches in the switch pool other than the last flow switch in the switch pool to have a default entry with a default action that forwards a subsequent packet that does not match any of the flow entries in the forwarding table of that particular flow switch to the next flow switch along the flow path in the switch pool. It should be noted that the forwarding tables of the flow switches in the switch pool can be configured or programmed in any order.

According to embodiments of the present invention, the flow switch in the switch pool that is configured to have the flow entry associated with the particular flow can be selected based on one of a shortest-path first selection, a round-robin selection, a shortest-table first selection, or a longest-table first selection. In other embodiments, other selection methods or algorithms can be used. At least one of the flow switches in the switch pool can be part of another flow path for a different flow, and that flow switch can also be part of another switch pool. If the switch pool is an ingress switch pool, then only one of the flow switches in the switch pool is an ingress flow switch for all flows that are associated with the flow entries in the forwarding tables of the flow switches in the switch pool. If the forwarding tables of all flow switches in the switch pool reach their respective maximum forwarding table sizes, an additional flow switch along the flow path can be added to the switch pool.

Figure 7:
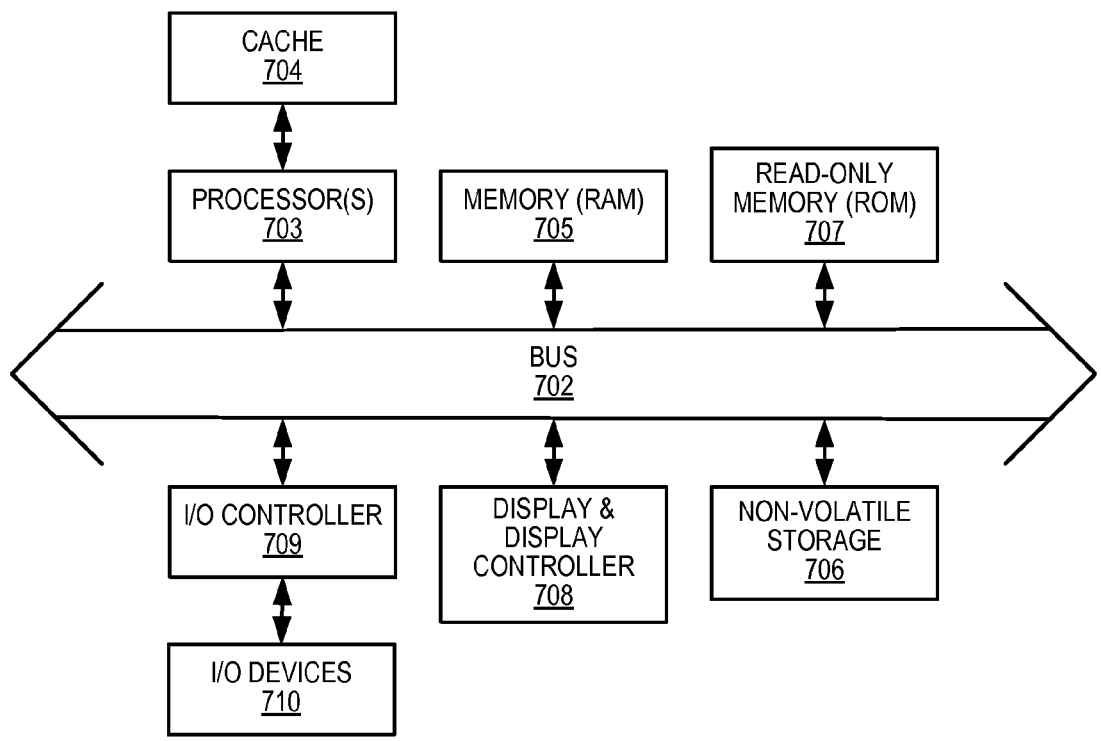
FIG. 7 illustrates a system in a network element according to one embodiment of the invention.

Different embodiments of the invention (e.g., the centralized network controller, flow switch, etc.) may be implemented using different combinations of software, firmware, and/or hardware, for example, using the system shown in FIG. 7. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory 705; read only memory 707; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors 703 coupled to one or more other components, such as one or more storage devices (non-transitory machine-readable storage media), user input/output devices 710 (e.g., a keyboard, a touchscreen, and/or a display 708), and network connections. The coupling of the set of processors and other components is typically through one or more busses 702 and bridges (also termed as bus controllers). Thus, the storage device of a given electronic device typically stores code and/or data for execution on the set of one or more processors 703 of that electronic device.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). Furthermore, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a centralized flow controller for reducing forwarding table sizes of forwarding tables in flow switches in a network, wherein each of the forwarding tables includes a set of flow entries and a default entry, the method comprising:

determining, in the centralized flow controller, a flow path in the network for a particular flow;

identifying a set of flow switches along the flow path to form a switch pool; and configuring a forwarding table of only one of the flow switches in the switch pool to have a flow entry that is associated with that particular flow, wherein the flow entry includes a set of match fields for identifying packets belonging to that particular flow, and a set of actions to be performed on the packets belonging to that particular flow.

2. The method of claim 1, further comprising:

configuring a forwarding table of a last flow switch in the switch pool to have a default entry with a default action to either send a subsequent packet that does not match any of the flow entries in the forwarding tables of the flow switches in the switch pool to the centralized flow controller in a subsequent packet-in message or drop that subsequent packet.

3. The method of claim 1, further comprising:

configuring a forwarding table of a flow switch other than a last flow switch in the switch pool to have a default entry with a default action that forwards a subsequent packet that does not match any of the flow entries in the forwarding table of the flow switch to a next flow switch along the flow path in the switch pool.

4. The method of claim 1, wherein the step of determining the flow path for the particular flow is performed in response to receiving, in the centralized flow controller, a packet-in message to indicate that a packet is received in the network that does not match any of the flow entries in the forwarding tables of the flow switches in the network.

5. The method of claim 1, wherein the only one of the flow switches in the switch pool that is configured to have the flow entry associated with the particular flow is selected based on one of a shortest-path first selection, a round-robin selection, a shortest-table first selection, or a longest-table first selection.

6. The method of claim 1, wherein at least one of the flow switches in the switch pool is part of another flow path for a different flow, and that at least one of the flow switches is part of another switch pool.

7. The method of claim 1, wherein the switch pool is an ingress switch pool, and only one of the flow switches in the switch pool is an ingress flow switch for all flows that are associated with the flow entries in the forwarding tables of the flow switches in the switch pool.

8. The method of claim 1, wherein if the forwarding tables of the flow switches in the switch pool reach their respective maximum forwarding table sizes, an additional flow switch along the flow path is added to the switch pool.

9. A centralized flow controller for reducing forwarding table sizes of forwarding tables in flow switches in a network, wherein each of the forwarding tables includes a set of flow entries and a default entry, the centralized flow controller comprising:

a flow assignment module configured to determine a flow path for a particular flow, a set of match fields for identifying packets belonging to that particular flow, and a set of actions to be performed on the packets belonging to that particular flow; and a switch pool configuration module coupled to the flow assignment module, the switch pool configuration module configured to:

identify a set of flow switches along the flow path of the particular flow to form a switch pool;

select only one of the flow switches in the switch pool to be programmed for that particular flow; and program, in the forwarding table of the one of the flow switch selected, a flow entry to be associated with that particular flow with the set of match fields for identifying the packets belonging to that particular flow, and the set of actions to be performed on the packets belonging to that particular flow.

10. The centralized flow controller of claim 9, wherein the switch pool configuration module is further configured to:
configure a forwarding table of a last flow switch in the switch pool to have a default entry with a default action to either send a subsequent packet that does not match any of the flow entries in the forwarding tables of the flow switches in the switch pool to the centralized flow controller in a subsequent packet-in message or drop that subsequent packet.

11. The centralized flow controller of claim 9, wherein the switch pool configuration module is further configured to:
configure a forwarding table of a flow switch other than a last flow switch in the switch pool to have a default entry with a default action that forwards a subsequent packet that does not match any of the flow entries in the forwarding table of the flow switch to a next flow switch along the flow path in the switch pool.

12. The centralized flow controller of claim 9, wherein the flow assignment module is configured to determine the flow path for the particular flow in response to receiving a packet-in message to indicate that a packet is received in the network that does not match any of the flow entries in the forwarding tables of the flow switches in the network.

13. The centralized flow controller of claim 9, wherein the switch pool configuration module is configured to form the switch pool and select the one of the flow switches in the switch pool to have the flow entry that is associated with the particular flow based on one of a shortest-path first selection, a round-robin selection, a shortest-table first selection, or a longest-table first selection.

14. The centralized flow controller of claim 9, wherein at least one of the flow switches in the switch pool is part of another flow path for a different flow, and that at least one of the flow switches is part of another switch pool.

15. The centralized flow controller of claim 9, wherein the switch pool is an ingress switch pool, and only one of the flow switches in the switch pool is an ingress flow switch for all flows that are associated with the flow entries in the forwarding tables of the flow switches in the switch pool.

16. The centralized flow controller of claim 9, wherein the switch pool configuration module is configured to add an additional flow switch along the flow path to the switch pool if the forwarding tables of the flow switches in the switch pool reach their respective maximum forwarding table sizes.

17. A switch pool for reducing forwarding table sizes in flow switches in a network having a centralized flow controller, the switch pool comprising:
a plurality of flow switches coupled along a flow path, wherein each of the flow switches in the switch pool comprises:
a communications module configured to send and receive messages to the centralized flow controller;
a forwarding table configured to store:
a set of flow entries associated with corresponding flows in the network, wherein each flow entry includes:
a set of match fields for identifying packets belonging to a flow that is associated with the flow entry;
a set of actions to be performed on packets belonging to the flow that is associated with the flow entry; and
a default entry including a default action to be performed on packets that do not belong to any of the flows that are associated with the flow entries in the forwarding table of the flow switch; and
a forwarding module configured, for each packet that is received on a port of the flow switch, to:
determine if header and port information of the packet matches the set of match fields in one of the flow entries in the forwarding table;
if the header and port information of the packet matches the set of match fields in one of the flow entries, performing the set of actions in that flow entry; and
if the header and port information of the packet does not match any of the sets of match fields in the flow entries, performing the default action in the default entry;
wherein only a last flow switch in the switch pool has a default action that is to send a packet that does not match any of the flow entries in the switch pool to the centralized flow controller in a packet-in message or to drop that packet.

18. The switch pool of claim 17, wherein each of the forwarding tables of the flow switches in the switch pool other than the last flow switch has a default entry with a default action that forwards a packet that does not match any of the flow entries in the forwarding table of the particular flow switch to a next flow switch along the flow path in the switch pool.

19. The switch pool of claim 17, wherein at least one of the flow switches in the switch pool is part of another flow path for a different flow, and that at least one of the flow switches is part of another switch pool.

20. The switch pool of claim 17, wherein the switch pool is an ingress switch pool, and only one of the flow switches in the switch pool is an ingress flow switch for all the flows that are associated with the flow entries in the forwarding tables of the flow switches in the switch pool.

21. The switch pool of claim 17, wherein at least one of the flows is associated with at most one flow entry in the entire switch pool.

* * * * *